Jan. 13, 1970      T. G. FARIA      3,490,043

STACKED CONSTRUCTION ELECTRIC METER

Filed Nov. 23, 1965      3 Sheets-Sheet 1

INVENTOR
THOMAS G. FARIA
BY Bowyer and Witherspoon
ATTORNEYS

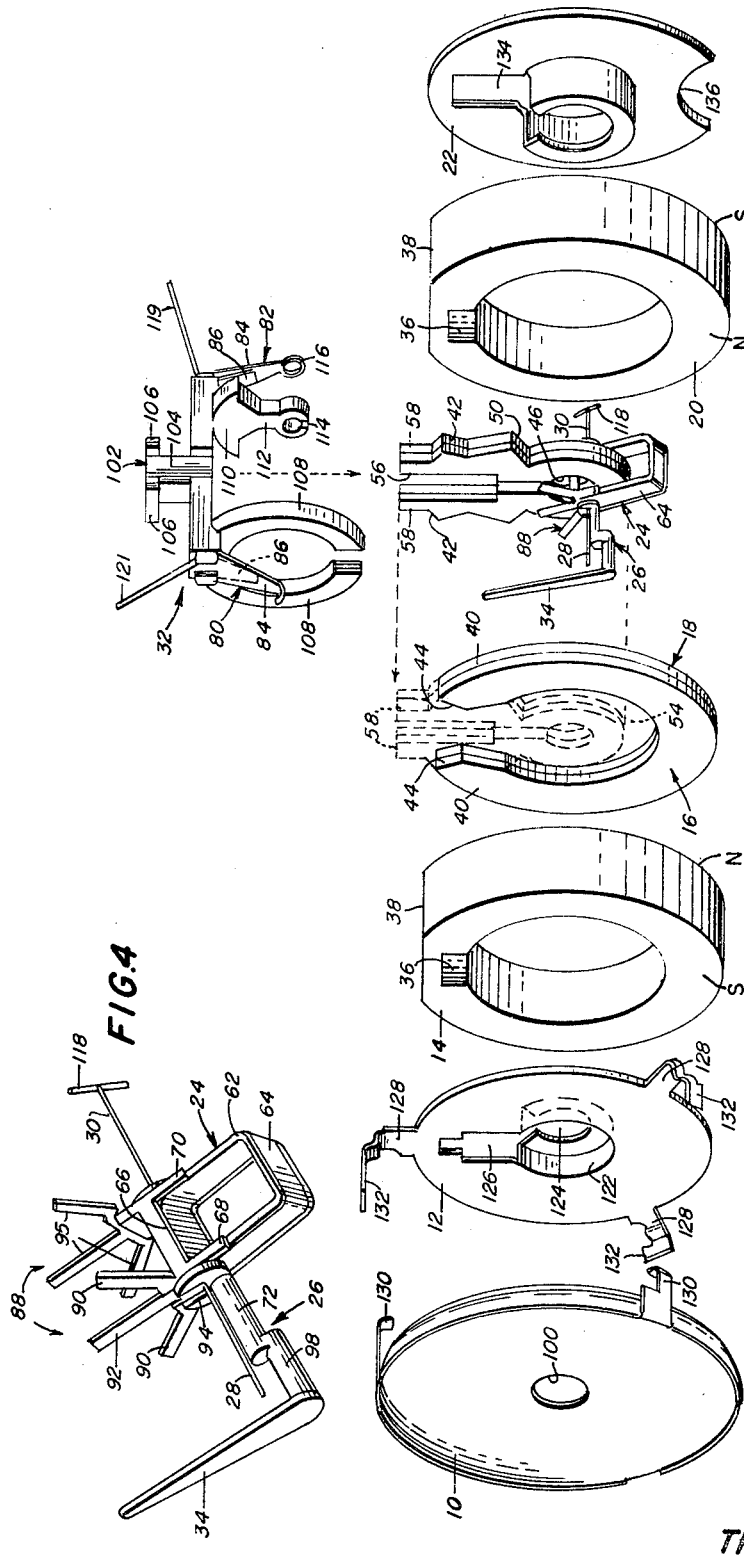

Jan. 13, 1970    T. G. FARIA    3,490,043
STACKED CONSTRUCTION ELECTRIC METER
Filed Nov. 23, 1965    3 Sheets-Sheet 3

INVENTOR
THOMAS G. FARIA

United States Patent Office 3,490,043
Patented Jan. 13, 1970

3,490,043
STACKED CONSTRUCTION ELECTRIC METER
Thomas G. Faria, 25 Park Drive,
Waterford, Conn. 06385
Filed Nov. 23, 1965, Ser. No. 509,366
Int. Cl. G01r 1/20
U.S. Cl. 324—150                                    11 Claims

ABSTRACT OF THE DISCLOSURE

This invention relates to an electric meter having a stacked array of magnetic members comprising a top pole piece, a top permanent magnet, at least one intermediate core piece, a bottom permanent magnet and a bottom pole piece. The meter also has a bridge which maintains alignment of the core piece and the two permanent magnets, said bridge also supporting a movable coil within the magnetic array.

---

This invention relates to an electric meter of the moving coil type wherein the magnetic portions of the meter are in stacked relationship.

It is an object of this invention to provide a meter of the moving coil type wherein the needle and associated scale extend over a major portion of a circumference to enable easy reading of a scale.

It is a further object of the invention to provide for ease of assembly of the meter through the provision of many stacked parts.

It is still a further object of the invention to provide for permanency of construction by dispensing with the use of bolts, screws and the like which may loosen or fall out during use of the meter.

It is yet another object of the invention to provide a compact and rugged filar suspension type of meter with provision to ensure against filar breakage.

Still other objects of the invention are to provide means to facilitate proper zeroizing of the instrument, proper tracking of scale readings with instrument input, compensation of flux fields to attain free coil movement, protection against magnetic material reaching the area in which the coil moves.

Other objects will become apparent after consideration of the following specification when taken in conjunction with the accompanying drawings in which:

FIG. 3 is an exploded view of the meter parts;

FIG. 4 is a perspective view of a carrier and associated coil;

Figure 1:
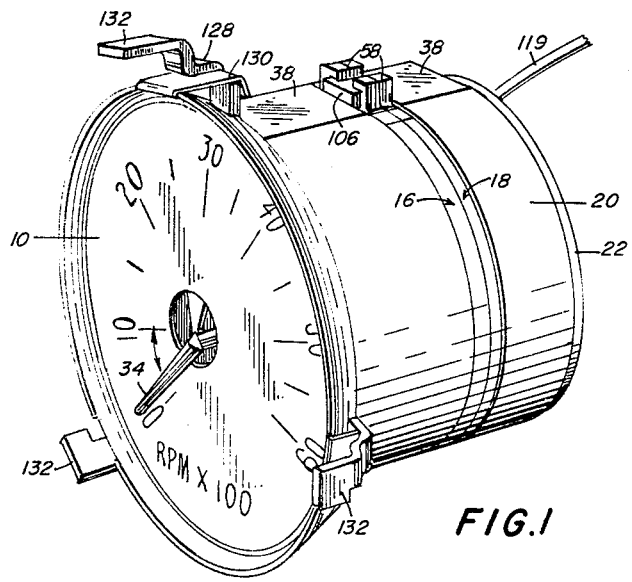
FIG. 1 is a front perspective view of a meter ready to be affixed to a support.
Figure 2:
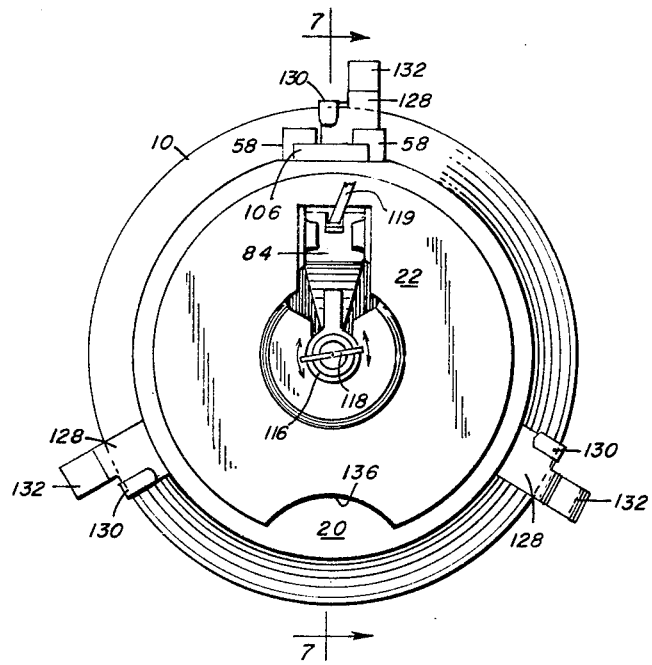
FIG. 2 is a rear elevational view of the meter.

Now considering the invention in greater detail, the meter is comprised of a number of parts held together in any suitable fashion. It has been found that an easy and permanent assembly of parts can be effected without the use of bolts, nuts or the like by relying upon the coercive forces generated by permanent magnets utilized in the device and bonding agents such as epoxy resin to secure parts in finally adjusted position.

The meter in general comprises, firstly, in contacting stacked relation, a dial 10, a top pole piece 12, a top permanent magnet 14, a top core piece 16, a bottom core piece 18, a bottom permanent magnet 20 and a bottom pole piece 22. Secondly, the meter comprises a movable bobbin 24 fixed to a movable carrier 26 filar suspended by upper and lower conductive torsion ribbons 28, 30 mounted by suitable means on a bar support or bridge 32. The carrier also has affixed thereto a pointer 34 operative over the dial.

The two permanent magnets 14, 20 are alike and, therefore, a description of one suffices for both.

Figure 7:
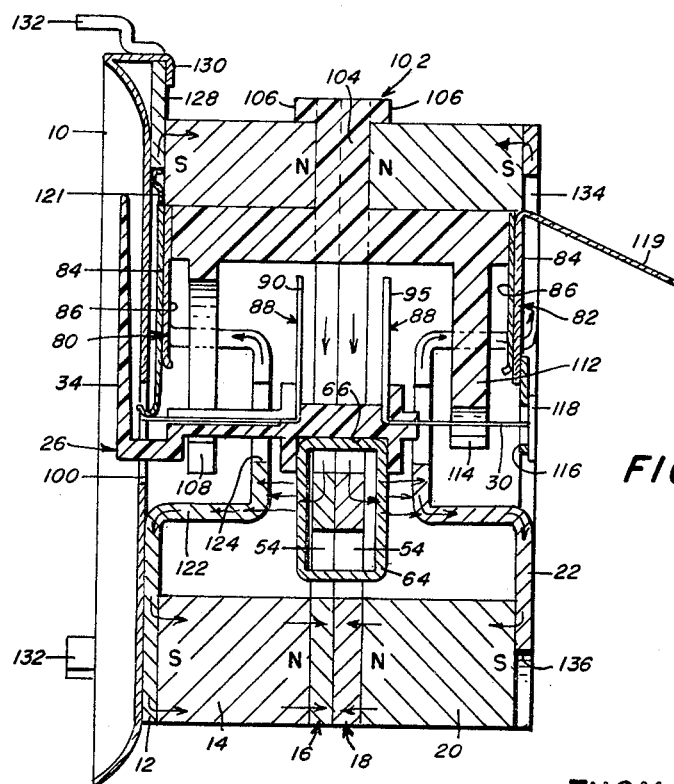
FIG. 7 is a section along the line 7—7 of FIG. 2.

The permanent magnet is composed of any suitable material as a ferrite, specifically oriented barium ferrite, magnetized to have a high coercive force and is substantially in the form of a cylindrical ring with recess 36 in the inner wall of the cylinder perpendicular to the flat face of the ring, for accommodating and being oriented by the position of a portion of the carrier for the coil, as will be explained. It is also provided with a flattened area 38 for facilitating alignment of parts. The magnet is magnetized so that the flat faces are of opposite polarity, indicated in FIG. 3 as N and S. When assembled, the N faces of both magnets are in opposition to one another, as will be seen in FIG. 7.

The two core pieces 16 and 18 are also alike. Each core piece is a disc made of a low coercive, high permeable material, as of a low carbon content soft steel, and is made of separable pieces to allow for insertion of the coil in assembly of the meter. While the parts may be made separable in various ways to accomplish this purpose, a preferred structure is one wherein the core piece is made of a large arcuate portion 40 and a smaller portion 42, the portion 42 being tightly fitted in and frictionally held between the ends of the arcuate portion 40. The portion 40 is an incomplete ring of substantially the same external diameter as the corresponding diameter of the magnet 14, the opposing ends of the incomplete ring being provided with non-linear edges, as edges 44, to prevent radial displacement of the interfitting piece 42, the piece 42 having edges mating with the edges on piece 40. Desirably, to reduce the leakage from one pole face to another, the width of the ring is reduced to lie within the borders of the magnet rings. The inner piece 42 has a central opening 46 to accommodate the carrier 26 and a frame portion of bobbin 24. The part 42 is also provided with an integral neck portion 50 and circular inner ring 52, whose outside diameter is less than the internal diameter of the arcuate portion 40 to provide an arcuate slot 54 of substantially 250° for arcuate movement of another portion of the bobbin. The member 42 is further slotted as at 56 to permit assembly of the carrier with its coil. Member 42 is also provided with ears 58 for retaining the bridge 32 in place, the carrier and members 40 and 42 are temporarily frictionally held by the support until finally held in place by the bonding means utilized, as epoxy resin. While two pieces 16 and 18 are illustrated, it is obvious they could be combined into one piece.

The bobbin 24 comprises a non-magnetic bobbin frame 62 as of aluminum or similar light non-magnetic material about which is wound the copper coil 64. The bobbin is fractionally held in a portion of the carrier 26, which is provided with a vertical abutment 66 and horizontal top and bottom recessed seats 68 and 70. To ensure permanency of construction, the bobbin is furthermore cemented in place. The carrier is of light weight material, as of plastic material, and has a vertical extension 72 in the form of a partially cylindrical housing to partially surround the ribbon 28 and prevent excessive movement of the carrier. If desired, a similar extension may be provided to surround the ribbon 30.

The ribbons 28 and 30 form filar suspensions for the bobbin and the carrier and are connected respectively to the two ends of the coil 64. The torsion ribbon 28 is connected at its upper end to the cantilevered end of a triangular spring suspension 80 and the ribbon 30 at its lower end is connected to the cantilevered end of a triangular spring suspension 82. The opposite ends of the spring suspension are fastened to the bridge 32 in any suitable fashion, as by heat forming knobs integral with the bridge, which knobs have shanks extending through slots in the springs. Each suspension embodies an outer spring leaf 84 of bronze or the like and an inner spring leaf 86 of similar material shorter in length than the leaf 84 and bearing thereagainst. By reason of this dual leaf construction, flexure of the springs is braked and prevents undue vibration being imparted to the coil suspension during shipment or otherwise rough handling of the instrument. However, if desired, these springs may be oiled and still provide a damping action on undue handling of the instrument.

Figure 5:
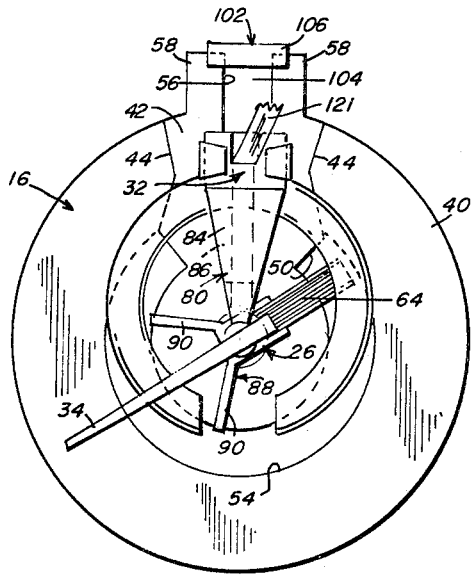
FIG. 5 is a top view of a subassembly of the meter, comprising core permeable members and a coil assembly.
Figure 6:
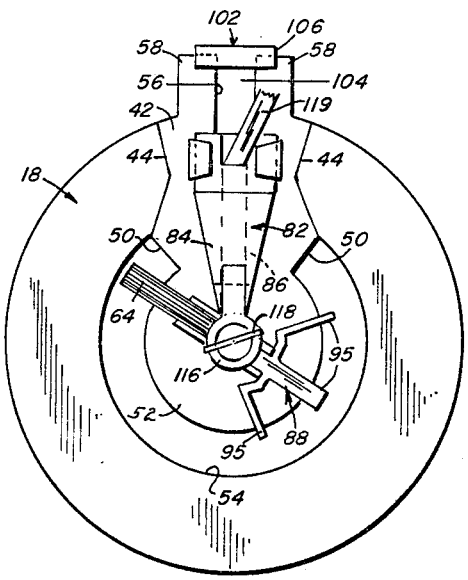
FIG. 6 is a rear view of the same subassembly.

To balance the coil and carrier with respect to the vertical axis defined by the vertically alined torsion ribbons, the carrier is provided with a double tripartite wing structure 88 which may partake of various forms. As illustrated in FIGS. 4, 5 and 6, the carrier 26 is provided with two sets of integral wings 90, also of plastic, and a third wing 92 of metallic non-magnetic material as brass, frictionally held in ways 94 in the carrier. The free end of wing 92 can be clipped off, or solder added to it, to attain a desired balance or balance of moment of forces about the axis of the torsion ribbons. If desired, one or both of the three wing organizations just described may be replaced by a single brass structure wherein a wing, like wing 92, is set in the ways 94 and has two other brass integral wings diverging therefrom in the direction of the wings 90. This structure is illustrated at 95 in FIG. 4.

The carrier has a portion 98 offset from the portion 72 to provide space for the spring 80 to reach over the axis of ribbon 28, the upper end of the offset portion being integrally provided with the pointer 34. The pointer may be colored a distinctive color, as red, and for this purpose and for simplicity of manufacture, the entire carrier may be made of a plastic with color imparted thereto. The offset portion 98 operates in an aperture 100 in dial 10.

The bridge 32 is also of plastic material and, as previously described, has the spring leaves attached to the upper and lower ends thereof. The vertical shank of the bridge is rectangular in cross-section and is assembled with the core pieces 16 and 18 through the provisions of a rectangular in cross-section extension 102 necked at 104 to enable, during the assembly of parts, the bridge to be slid into the gap 56 between the ears 58. The extension is further provided with flanges 106 to overlap the ears of the two stacked members 42 to assist in centering the permanent magnets with respect to the remainder of the instrument. The bridge is further provided with integral arcuate arms 108 which enter the center opening of the top permanent magnet and with an arcuate portion 110 which enters the central opening in the lower permanent magnet. The lower arcuate portion is further provided with an extension 112 slotted at its free end as indicated at 114 to receive the torsion ribbon 30 during assembly of the instrument. The extension serves to prevent undue lateral vibration of the ribbon 30. The connection of the ribbon 30 to spring leaf 82 is modified to permit rotational adjustment of the pointer with respect to the scale on the dial by imparting a desired degree of twist to the torsion ribbons before affixing the ribbon 30 to the spring leaf support 82. For this purpose, the free end of the bottom spring leaf 84 is integrated with a collar 116 and the free lower end of the torsion ribbon 30 is soldered or brazed or spot welded to a cross bar 118 straddling the collar. Manual rotation of the bar will zeroize the pointer after which the bar may, if desired, be permanently affixed to the collar. In ordinary usage further adjustment of the zero position is not necessary and the cross bar and collar are soldered together. Another method for securing zero adjustment is to rotate the top pole piece and its attached dial until a zeroizing of the needle is attained, prior to bonding the pole piece to the top magnet. In this case the bottom ribbon suspension need not use the cross bar arrangement.

The bridge and its integral parts afford means whereby assembly of the major portions of the meter may be facilitated and furthermore provide means whereby the permanent magnets, the central core pieces 16, 18 and the suspension for the coil are properly alined.

Initially the coil carrier and bridge are assembled as is apparent from the previous description of parts. Thus, the two core pieces 16, 18 are alined with each other and, if desired, bonded together with a resin, and the carrier and bridge assembly are associated with the core pieces, as previously described. The top and bottom magnets may now be added, walls of the recessed portions 36 of the magnets fitting about the vertical rectangular shank of the bridge and the arcuate portions 108 and 110 assisting in centering the magnets. Current to the coil via the spring leaves is effected by affixing leads to the leaves, the current path then being via the spring leaves, the ribbons and the coil. One terminal is indicated at 110. The other terminal may be a grounded terminal as by connecting a flexible lead as 121 from the spring suspension to the pole piece 12.

In order to complete the instrument and to obtain further adjustments of parts, as well as other advantages, as will be pointed out, the top and bottom pole pieces 12 and 22 are employed. The top pole piece 12 is a dished structure having a flat peripheral portion 120 and a recessed portion 122, the recessed portion fitting into the central opening of magnet 14. The recessed portion has a central opening 124. Besides the central opening being provided to enable free rotation of the carrier, the top pole piece is furthermore radially slotted, as indicated at 126, to enable slipping of the pointer through the pole piece in assembly of the instrument and to accommodate the spring support 80. The pole piece is further provided with lugs 128, as, for example, three lugs spaced 120° apart, for securement thereto of the dial 10, the dial 10 for the purpose being provided with downwardly extending matching lugs 130, bent under or otherwise fastened to the lugs 128. The dial is dished and provided with suitable scale markings in the dished portion, the markings depending on the use of the instrument. When used as a tachometer the scale markings would be in terms of revolutions per minute. As an ammeter the scale markings would indicate amperes or milliamperes, etc. The lugs 128 are further extended upwardly, as indicated at 132, to provide means for mounting the instrument in a case or against a support structure.

The lower pole piece 22 is dished, like the upper pole piece, to allow for initial centering of the pole piece in the permanent magnet 20. It also is slotted, as indicated at 134, to accommodate the lower spring suspension 82. The dished portion in the pole piece 22 also enables free access to be had to the cross bar 18 to make the desired zero adjustment of the pointer. The pole piece further has a portion of it cut away, as indicated at 136, to make it non-uniform in magnetization characteristics. In order to enable true tracking of the needle on the dial with increase in current flow through the coil, the lower pole piece may be laterally adjusted with respect to the magnet 20. In long scale moving coil meters, any misalignment of coil, core or poles will cause non-linearity. For example, applying 50% of full scale current may yield a dial reading of 55% instead of 50%. With the construction herein described, by simply sliding the lower pole piece off center in a direction to compensate for the non-linearity, linearity will be achieved. For this purpose the dished portion is smaller in diameter than the interior diameter of magnet 20. While the cut out portion 136 is helpful in obtaining this linearity, it is not essential since mere shifting of the pole piece will attain this result.

In assembling the magnets, the like pole pieces, as the north poles, are arranged adjacent each other so that the flux path, so far as the coil is concerned is, for example, for the upper half of the assembly, from the lower face of the magnet 14, through the neck portion 50 of the core piece 16 centrally inward toward the inner ring 52, through the inner ring, then upwardly across the reluctance gap in which is located the horizontal reach of the coil, through the upper pole piece 12 and thence back to the upper face of magnet 14, tending to swing the coil laterally.

A similar path for the flux is established through the lower half of the instrument. The arrangement providing for the two flux paths balances the magnetic pull on the coil and compensates for any non-linear dial tracking which could be produced by axial misalignment of the inner rings of the core pieces or by more force exerted by one pole piece in an isolated area than in other areas.

It should be noted that by reason of the pole pieces 12 and 22 extending substantially across the space in which the bobbin moves, there is little possibility of attraction of magnetic particles into this space. Rather, these particles would be attracted to high magnetic potential areas on the exterior of the meter. Therefore, interference with movement of the coil is avoided to a great extent.

After all of the parts have been assembled, epoxy resin or the like could be applied to external joints between parts bond to them together.

While the terms "top" and "bottom" and the equivalents have been utilized, it is to be understood that this has been solely for ease in description and correlations of parts. In actual use of the meter, it may be used in any position since the moving coil is fully balanced.

What is claimed is:

1. An electric meter having a stacked array of magnetic members, said array comprising in descending order of the elements: a top pole piece, a top permanent magnet with top and bottom pole faces, at least one intermediate core piece, a bottom permanent magnet with top and bottom pole faces, and a bottom pole piece, said top and bottom permanent magnets being in the form of rings, the core piece comprising an outer ring portion sandwiched in between the permanent magnets and having a width from inner to outer circumference substantially equal to that of the corresponding width of the permanent magnets, said core piece further having an inner arcuate portion with an arcuate gap between the inner and outer portions, said meter further including a bridge maintaining alignment of the core piece and the two permanent magnets, a coil movable in the magnetic array supported by the bridge and having a portion in the aforesaid arcuate gap, means for conducting current to the coil, a pointer movable with the coil and a dial associated with the array of magnetic members, said dial having a scale over which the pointer moves when the coil is energized.

2. The structure of claim 1 wherein the pole pieces extend over the space within the ring portions of the permanent magnets.

3. The structure of claim 2 wherein the pole pieces are dished, with the dished portions lying within the ring portions of the permanent magnets.

4. The structure of claim 3 wherein the lower dished portion is of less diameter than the internal diameter of the lower permanent magnet to enable lateral adjustment of the lower pole piece to effect proper tracking of the meter with the input.

5. The structure of claim 1 wherein the bridge has spring cantilever suspensions at each end thereof and the coil is suspended by said springs.

6. The structure of claim 5 wherein the bridge additionally is provided with arcuate means positioned within the ring portions of the permanent magnets to assist in centering the magnets during assembly of the permanent magnets with the core pieces.

7. The structure of claim 5 wherein the spring suspensions are each comprised of a plurality of superimposed contacting leaf springs.

8. The structure of claim 1 wherein the core piece is of a top to bottom thickness less than the corresponding top to bottom thickness of the permanent magnets and lies within the borders thereof.

9. A subassembly for an electric meter comprising a bar of non-conductive material forming a bridge between elements, said elements comprising a pair of metallic cantilever springs, one at each end of the bridge, a pair of arcuate arms perpendicularly to the bridge near one of the springs, an arcuate member perpendicular to the bridge near the second spring, a coil carrier and attached coil and pointer suspended by said springs by conductive ribbons, said ribbons being electrically connected to the coil, one of said ribbons being fixed to a spring and the other threaded through the spring, a cross bar connected to the threaded through end of said other ribbon and bearing against the associated spring, whereby by rotation of the cross bar the ribbons will be twisted to effect a displacement of the pointer to obtain an initial zero position thereof.

10. The structure of claim 9 wherein the carrier has an extension from the coil partially surrounding one of the ribbons to prevent excessive lateral vibration of the ribbon and an arcuate member extending perpendicularly from the bridge and provided with a slotted end opening to receive the other ribbon, to prevent excessive lateral vibration of said other ribbon.

11. An electric meter having a stacked array of magnetic members, said array comprising in descending order of the elements: a top pole piece, a top permanent magnet with top and bottom pole faces, at least one intermediate core piece, a bottom permanent magnet with top and bottom pole faces, and a bottom pole piece, said meter further including a bridge maintaining alignment of the core piece and the two permanent magnets, a coil movable in the magnetic array supported by the bridge, means for conducting current to the coil, a pointer movable with the coil and a dial associated with the array of magnetic members, said dial having a scale over which the pointer moves when the coil is energized, the top pole piece being rotatable with respect to the remainder of the stacked array to adjust the zero position of the pointer.

References Cited

UNITED STATES PATENTS

| 2,245,781 | 6/1941 | Hickok | 324—151 |
| 2,367,950 | 1/1945 | Lenehan | 324—150 |
| 2,419,100 | 4/1947 | Weaver | 171—95 |
| 2,886,782 | 5/1959 | Chambers et al. | 324—150 |
| 2,953,896 | 9/1960 | Van Horn et al. | 324—150 |
| 3,047,805 | 7/1962 | Gersch | 324—150 |

RUDOLPH V. ROLINEC, Primary Examiner

JERALD J. DEVITT, Assistant Examiner

U.S. Cl. X.R.

324—151, 154